A. E. WOODHULL.
Improvement in Bee Hives.
No. 122,302.  Patented Dec. 26, 1871.
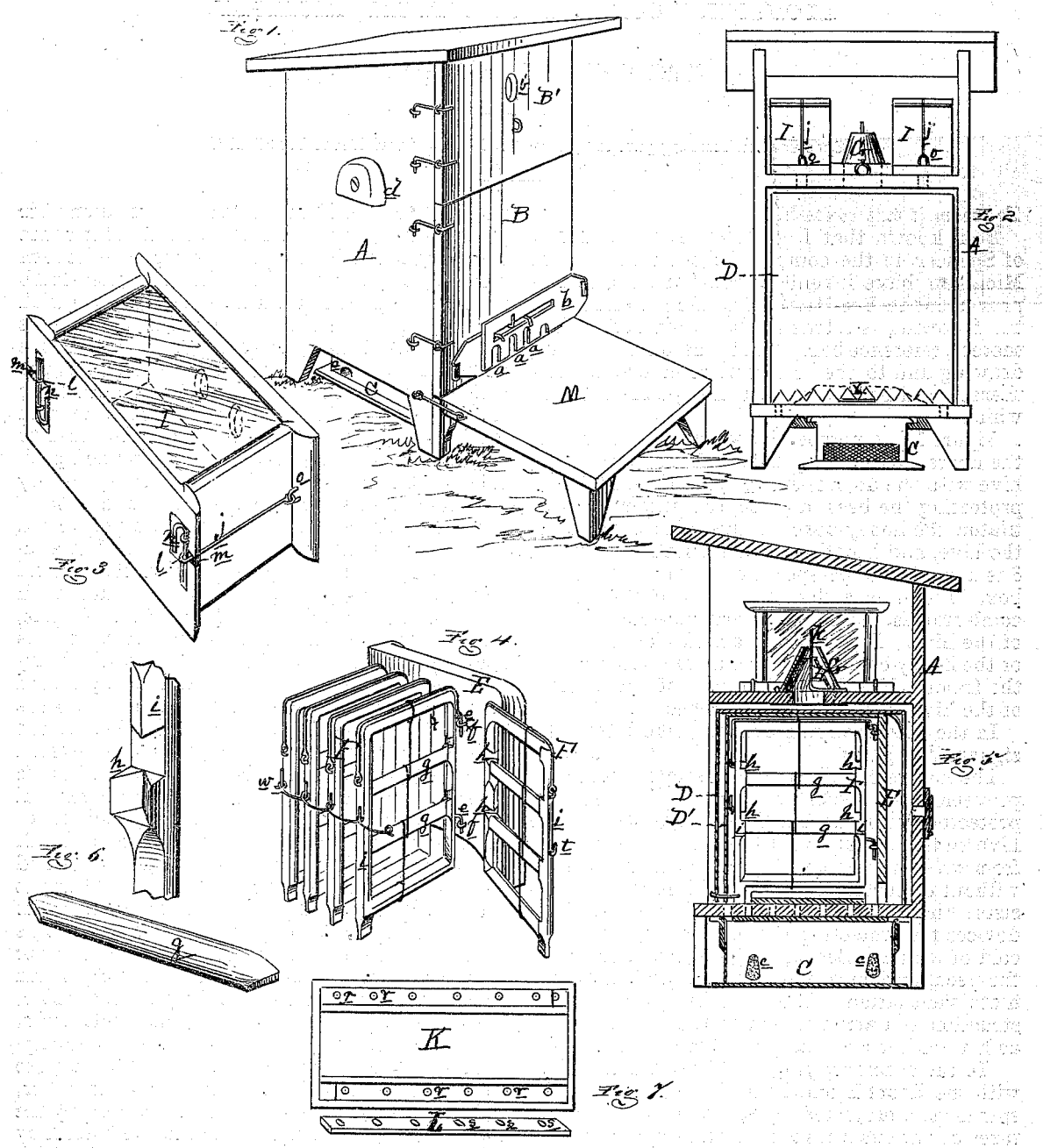

122,302

UNITED STATES PATENT OFFICE.

ALONZO E. WOODHULL, OF SPENCER, MICHIGAN.

IMPROVEMENT IN BEE-HIVES.

Specification forming part of Design No. 122,302, dated December 26, 1871.

*To whom it may concern:*

Be it known that I, ALONZO E. WOODHULL, of Spencer, in the county of Kent and State of Michigan, have invented a new and useful Improvement in Bee-Hives; and I do declare that the following is a true and accurate description thereof, reference being had to the accompanying drawing and to the letters of reference marked thereon and being a part of this specification, in which—

Figure 1 is a perspective view of the hive with the doors closed. Fig. 2 is a front view of the hive with the door open, showing the devices for protecting the bees in place, the automatic ventilator, the honey-boxes in the upper chamber of the hive, and a moth-trap beneath the hive. Fig. 3 is a detached perspective view of the honey-box. Fig. 4 is a detached view of the honey-comb frames. Fig. 5 is a vertical sectional view of the hive. Fig. 6 is a detached view of a part of the honey-comb frame and a bar removed from the frame. Fig. 7 is a plan view of the bottom of the hive with the slide detached.

In the accompanying drawing like letters designate like parts.

The nature of this invention relates to an improvement in bee-hives, whereby the bees are protected from the extreme cold of winter, the hive automatically ventilated in summer, and from which the honey may be taken at pleasure without disturbing the bees. This invention consists: First, in the arrangement, in a hive, of the devices for protecting the bees from the extreme cold of winter. Second, in the arrangement of the peculiar conical valves to automatically regulate ventilation. Third, in the peculiar construction and arrangement of the various parts, as hereinafter more fully set forth.

In the accompanying drawing, A is the hive, with the doors B and B' in front, with the bee-entrances $a$ protected by the slide $b$, with apertures of various sizes to be used as required, with the moth-trap C beneath the hive, with the holes $c$ leading into it lined with wire-cloth. On the side of the hive are holes for ventilation, covered by the slide $d$, and there are also holes low down in the back of the hive, not shown, for the same purpose, and protected in like manner. The hive contains a paper box, D, smaller than the hive, so that there is an open annular space between the box D and the hive A of about an inch wide. The box D in its turn covers a smaller paper box, D', with a like open annular space between the two boxes, and this box D' in its turn incloses the guide-board E with the honey-comb frames F suspended from it by the hooks $e$, which engage with the staples $f$. The frames F can be detached from the guide-board E by lifting the hooks $e$ from the staples $f$ when desired, and the frames F are so constructed that the cross-bar $g$ can be removed from the notched shoulder $h$ in the stile $i$ of the frame at pleasure. In order to keep the frames F parallel and in a fixed position, so that the combs should not be injured by the other frames nor the bees impeded in their work, the central frame slides in the groove $x$ in the bottom of the hive, and the frames F are retained in a position parallel with the central frame by a connecting-bar, $w$, provided with loops similar to those used on window-blinds, which engage with the hooks $t$ in front of the frames F. The boxes D and D' are, with the inclosed frames, drawn out of the hive by a cord or other device attached to the frames. In the center of the floor of the upper chamber of the hive is a hole for ventilation, which is covered by a hollow truncated cone, G, within which is a hollow cone, H, which is guided in its vertical movement by a wire, $k$, so that any sudden or strong draught of air through the cone G will cause the cone H to slide up on the wire $k$ and close the aperture of the cone G until the draught ceases, and then the cone H will fall back to its place, leaving the cone G open, as at first. The warm air passes through and out of the upper chamber at the orifice $b'$ in the door B', which orifice $b'$ is covered by wire-cloth on the inside, and closed, when necessary, by a slide, not shown, also on the inside. The honey-boxes I in the upper chamber are constructed of wood, with glass sides, and the top and bottom are held together, the sides and ends being rabbeted therein by the rod or wire $j$, which is attached to the bottom by the staple $o$ and to the top by a loop, $l$, which passes through the slot $m$ in the top, and is retained there by the bolt $n$, by means of which the box I can be opened and the honey removed without breaking the comb, and the box can be packed away in a small space until it is wanted again. The bottom K of the hive is inclined from the center and has holes $r$ on each side, which are closed on the under side by a slide, L, which has corresponding openings through which the dirt from the hive may be easily brushed when they are opened. In front of the hive A is the platform M, so hinged to the hive A that it can be turned up against the hive for protection in winter and to be used in summer as a table to place a hive upon when it is necessary to change the bees from one hive to another, and to support the frames F when drawn out of the hive A, or for any other necessary purpose.

What I claim as my invention, and desire to secure by Letters Patent, is—

1. The detachable paper boxes D and D', for forming with the hive A two fixed air-chambers over the bees to protect them from the extreme cold of the winter, constructed and arranged substantially as described and shown.

2. In a bee-hive, the hollow truncated cone G provided with the valve H and guide-wire $k$, constructed, arranged, and operating substantially as and for the purpose set forth.

ALONZO E. WOODHULL.

Witnesses:
G. T. FURNER,
EMELINE SQUIRES.